united States Patent Office 3,534,584
Patented Oct. 20, 1970

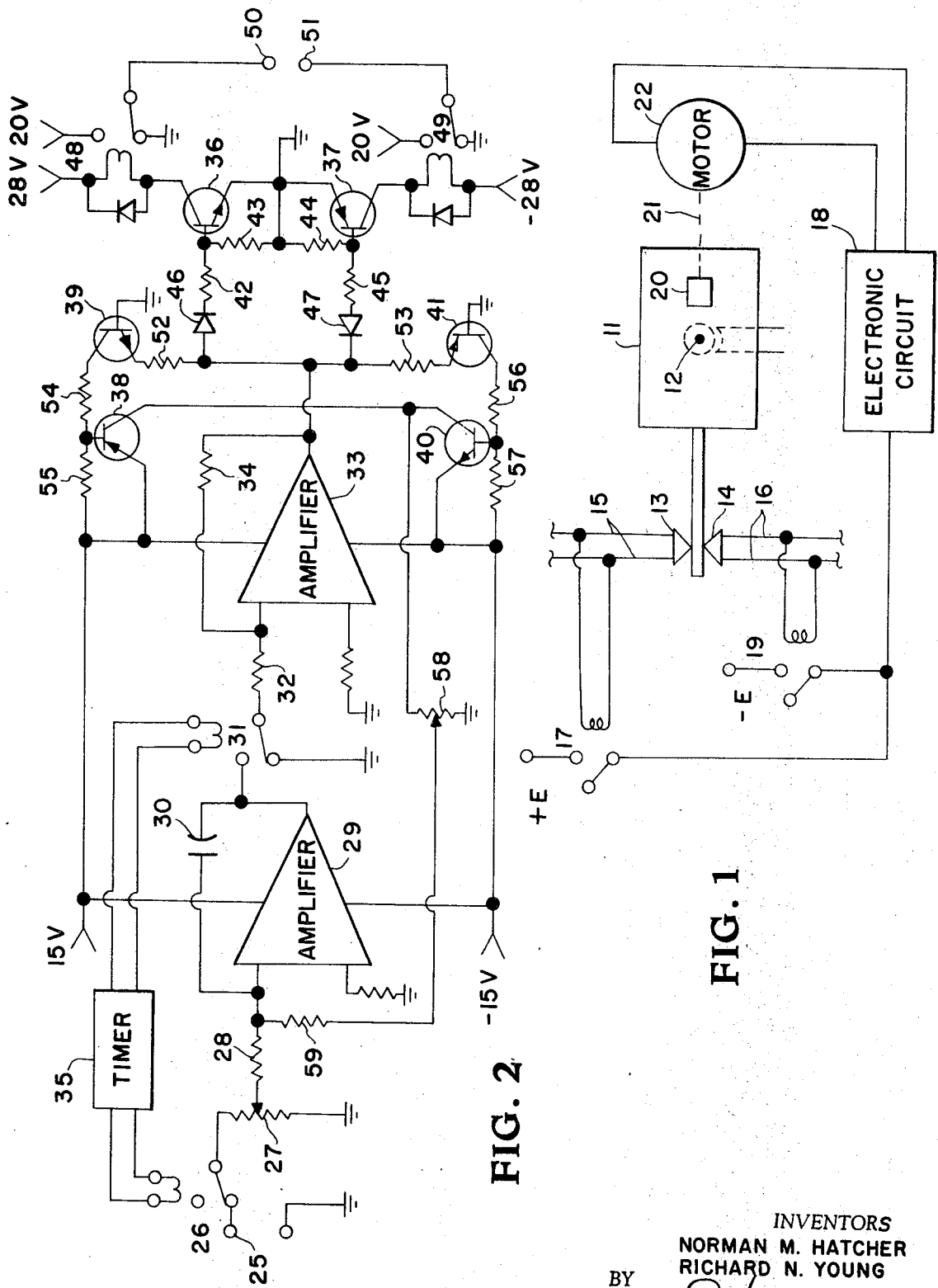

3,534,584
AUTOMATIC BALANCING DEVICE
Norman M. Hatcher, Houston, Tex., and Richard N. Young, Hampton, Va., assignors to the United States of America as represented by the Administrator of the National Aeronautics and Space Administration
Filed Feb. 27, 1969, Ser. No. 802,820
Int. Cl. G01p 21/00
U.S. Cl. 73—1        6 Claims

ABSTRACT OF THE DISCLOSURE

An automatic balancing device for a frictionlessly supported, attitude-controlled test platform about an axis that is orthogonal to the gravity vector. The device determines imbalance during limit cycle operation by measuring the differences in total impulse exerted by opposing torquers that are used for attitude control during a time interval. The device then moves a small weight an appropriate distance to compensate for the measured imbalance.

---

The invention described herein was made by employees of the United States Government and may be manufactured and used by or for the Government for governmental purposes without the payment of any royalties thereon or therefor.

The invention relates generally to automatic balancing system and more particularly concerns an automatic balancing device for use on frictionlessly supported attitude-controlled test platforms.

In developing and preflight testing spacecraft attitude sensors, attitude-control (torquing) systems, and other spacecraft components, it is often necessary to test these components on air-bearing or other supported, attitude-control-led platforms. For these applications the platforms must be balanced to the best possible extent; that is, to within a few thousand dyne-cm. Any imbalance can increase control-fuel usage or power consumption, decrease orientation accuracy, and increase the time initially required for the system to orient the platform.

Currently, most air-bearing supported platforms are balanced manually. However, balancing a platform manually is undesirable because the balancing process is time consuming and limited to accuracy. Another balancing system that the inventors have knowledge of derives imbalance information prior to a test by sensing the angular acceleration of the platform about its control axes. Neither this system nor the manual-balancing techniques can maintain the balance of a platform while a test is in progress. For tests of more than a few minutes, the platform may have to be rebalanced periodically to compensate for center-of-gravity shifts. These shifts can be caused by anisoelasticity (deflections of platform components due to gravity); unequal expansion of components due to temperature changes; component shifts due to necessary clearances between gears, bearings, and other devices, movements of such items as leads, which are not securely tied down; and unsymmetrical fuel usage with respect to the center of support. Compensation may also be made for the torquing effects of wire leads to the platform, air-bearing torques, and room air currents, for they may not vary appreciably with time. Thus, the need for a completely automatic balancing system is apparent.

It is therefore the primary object of this invention to provide an automatic balancing device for use on frictionlessly supported attitude-control test platforms.

Other objects of this invention are that this automatic balancing device have accuracy, reliability, fast response, compatibility with all vehicular torquing systems, ability to operate within a wide range of imbalances, and low weight, volume and power consumption.

Further objects and advantages of the invention will become apparent hereinafter and in the drawings in which:
FIG. 1 is a block diagram of the invention; and
FIG. 2 is a schematic diagram of the electronic circuitry used in the invention.

Turning now to the embodiment of the invention selected for illustration in the drawings, the number 11 in FIG. 1 designates a test platform which is mounted for rotation about an axis 12. The attitude of platform 11 about axis 12 is controlled by forces applied to the platform by opposing torquers 13 and 14. Torquers 13 and 14 are controlled by electrical signals from sensors (not shown) through wires 15 and 16, respectively. Torquer 13 is operative while a signal is applied across wires 15, and torquer 13 is operative while a signal is applied across wires 16. The coil of a relay 17 is connected across wires 15 so that while torquer 13 is operative relay 17 is closed and a +E voltage is applied to an electronic circuit 18. The coil of a relay 19 is connected across wires 16 so that while torquer 14 is operative relay 19 is closed and a —E voltage is applied to electronic circuit 18. Inasmuch as torquers 13 and 14 are never both operative at the same time, the +E and —E voltages can be applied directly to electronic circuit 18.

A small weight 20 is located on platform 11 such that when there is any imbalance of platform 11, the weight can be moved to compensate for the imbalance. The shaft 21 of a motor 22 is attached to weight 20 to move it on platform 11. This can be done by having shaft 21 threaded. Electronic circuit 18 includes an integrator which periodically integrates the voltages applied to it for a predetermined period of time and then drives motor 22 at a constant speed for a time proportional to the amplitude of the voltage at the output of the integrator at the end of each predetermined period of time. If the output of the integrator is positive the motor is driven in one direction and if the output of the integrator is negative the motor is driven in the other direction. Hence, weight 20 is moved in either of two directions to compensate for any imbalance of platform 11 about axis 12.

In FIG. 2 there is shown a schematic drawing of the electronic circuit 18 in FIG. 1. The input to this circuit is an input terminal 25 which is connected through a relay 26 and a potentiometer 27 to ground. The purpose of potentiometer 27 is to provide an adjustment for the input-signal amplitude to make it compatible with the gain of the following circuitry. The slider of potentiometer 27 is connected through a resistor 28 to the input of an integrator consisting of an amplifier 29 with a feedback capacitor 30. The output of the integrator is connected through a relay 31 and a resistor 32 to an amplifier 33 having a feedback resistor 34. The coils of relays 26 and 31 are connected to a timer 35. The function of timer 35 is to periodically apply no voltage to the coils of relays 26 and 31, during a first predetermined interval of time and apply a voltage to the two coils during a second predetermined interval of time. Hence, during the first predetermined interval of time the contacts of relays 26 and 31 are as shown and the input is applied to the integrator and during the following second predetermined interval of time the input is disconnected from the integrator and the output of the integrator is applied to amplifier 33. After a second predetermined interval of time the input is again applied to the integrator for the first predetermined interval of time. Timers that will perform the function of timer 35 are well known, hence the details of timer 35 are not disclosed.

The output of amplifier 33 is connected to a relay drive circuit including transistors 36 and 37, and to an integrator discharge circuit including transistors 38, 39, 40 and 41. In the relay drive circuit a resistance network consisting of resistors 42, 43, 44 and 45 is connected to the bases of transistors 36 and 37, and to the output of amplifier 33 through diodes 46 and 47. The emitters of transistors 36 and 37 are connected to ground. The collector of transistor 36 is connected through the coil of a relay 48 to a 28-volt supply, and the collector of transistor 37 is connected through the coil of a relay 49 to a —28 volt supply. While the coils of relays 48 and 49 have no current passing through them the contacts of the relays are as shown and terminals 50 and 51 are connected to ground. While the coil of relay 48 has current passing through it, terminal 50 is connected to a 20-volt supply and while the coil of relay 49 has current passing through it terminal 51 is connected to the 20-volt supply. Terminals 50 and 51 are connected to motor 22 in FIG. 1.

In the integrator discharge circuit the bases of transistors 39 and 41 are connected to ground and their emitters are connected through resistors 52 and 53, respectively, to the output of amplifier 33. The collector of transistor 39 is connected through resistors 54 and 55 to a 15-volt supply, and the collector of transistor 41 is connected through resistors 56 and 57 to a —15 volt supply. The base of transistor 38 is connected to the junction of resistors 54 and 55, and the base of transistor 40 is connected to the junction of resistors 56 and 57. The emitter of transistor 38 is connected to the 15-volt supply and the emitter of transistor 40 is connected to the —15 volt supply. The collectors of transistors 38 and 40 are connected together and to a potentiometer 58. The slider of potentiometer 58 is connected through a resistor 59 to the input of amplifier 29. If the output of amplifier 33 is positive, transistor 41 becomes conductive causing transistor 40 to become conductive. Hence, the —15 volt supply is applied to the input of amplifier 20 to discharge capacitor 30. If the output of amplifier 33 is negative, transistors 38 and 39 become conductive and the 15-volt supply is applied to the input of amplifier 29 to discharge capacitor 30. The purpose of potentiometer 58 is to control the discharge rate of capacitor 30.

In describing the operation of this invention it will be assumed that there is an imbalance in platform 11. Hence, there is an input applied to either torquer 13 or torquer 14. Consequently the contacts of either relay 17 or relay 19 are closed and a voltage is applied to the electronic circuit 18. Assume that the state of timer 35 is such that no current is flowing through the coils of relays 26 and 31. Then the voltage applied to the electronic circuit is applied through potentiometer 27 and resistor 28 to the integrator thus charging integrating capacitor 30. When timer 35 changes state current flows through the coils of relays 26 and 31 causing their contacts to close. In this state the input to the integrator is disconnected from the input terminal 25 and the output of the integrator is connected to the input of amplifier 33. Assume that the charge on capacitor 30 is such that the output of amplifier 33 is positive. Then the emitter of transistor 41 is positive with respect to its base causing it to conduct. The resulting flow of current through resistors 56 and 57 causes the base of transistor 40 to become positive with respect to its emitter. Hence, transistor 40 conducts and the —15 volt supply is applied to potentiometer 58. The negative voltage at the slider of potentiometer is applied through resistor 59 to capacitor 30 to discharge it. The positive voltage at the output of amplifier 33 is also applied through diode 46 and resistor 42 to the base of transistor 36, causing it to conduct. The resulting flow of current through the coil of relay 48 actuates the relay and connects the 20-volt supply to motor 22. This causes the motor to move weight 20 to compensate for the imbalance of platform 11.

If the charge on capacitor 30 is such that the output of amplifier 33 is negative, transistors 38 and 39 become conductive and the 15-volt supply is applied through potentiometer 58 and resistor 59 to capacitor 30 to discharge it. The negative voltage at the output of amplifier 33 is also applied through diode 47 and resistor 45 to the base of transistor 37, causing it to conduct. The resulting flow of current through the coil of relay 49 actuates the relay and connects the 20-volt supply to motor 22 which moves weight 20 to compensate for the imbalance of platform 11. The purpose of diodes 46 and 47 is to hold the sensitivity of the relay-drive circuit below that of the integrator-discharged circuit so that motor 22 will turn off before capacitor 30 ceases to discharge.

This invention has several advantages over the prior art. It can balance a platform more quickly with a higher degree of balance accuracy. It can operate automatically for any desired period of time, and it eliminates the requirement of interrupting tests in progress in order to rebalance the platform.

What is claimed is:

1. A device for automatically balancing an attitude-controlled test platform of the type that utilizes two torque-producing devices for controlling the rotational attitude of the platform about an axis comprising:
    means for producing an electrical signal indicative of the direction of the torque produced by said two torque-producing devices;
    means for periodically integrating said electrical signal for a predetermined length of time;
    a weight on the surface of said platform;
    a motor connected to said weight for moving it in either of two directions on said surface; and
    means connected to the output of said integrating means for driving said motor at a constant speed for a time proportional to the amplitude of the output of said integrating means at the end of said predetermined time and in a direction indicative of the polarity of the output of the integrating means whereby said weight is moved on the surface of said platform to compensate for any imbalance of said platform.

2. A device according to claim 1 wherein said means for periodically integrating said electrical signal for a predetermined length of time includes an integrator, switching means connected between said means for producing an electrical signal and the input of said integrator, and timer means for controlling said switching means so that said electrical signal is connected to the input of said integrator for said predetermined length of time and then disconnected therefrom for a second predetermined length of time.

3. The device according to claim 2 including an integrator discharge circuit and a second switching means connected between the output of said integrator and the integrator discharge circuit under the control of said timer means for disconnecting said integrator from said integrator discharge circuit during said predetermined time and for connecting said integrator to said integrator discharge circuit during said second predetermined time.

4. A device according to claim 1 wherein said means for driving said motor includes an integrator discharge circuit for discharging said integrating means at a constant rate until the integrating means is fully discharged and means connected to the output of said integrating means for applying a constant voltage to said motor in a direction indicative of the polarity of the charge on the integrating means and for a period beginning at the time that the integrating means begins to discharge and ending when the integrating means becomes fully discharged.

5. A device according to claim 4 wherein said integrator discharge circuit includes means responsive to the output of said integrating means for applying an opposite polarity constant voltage to the input of the integrating means to discharge the integrating means.

6. A device according to claim 4 wherein said means for applying a constant voltage to said motor includes switching means responsive to the output of said integrating means for applying said constant voltage to said motor in one direction while the polarity of the output of said integrating means is positive and for applying said constant voltage to said motor in the other direction while the polarity of the output of said integrating means is negative.

References Cited

UNITED STATES PATENTS

| | | |
|---|---|---|
| 3,203,224 | 8/1965 | Aske. |
| 3,210,989 | 10/1965 | Samborsky et al. _____ 73—65 |
| 3,427,896 | 2/1969 | Hartman _____ 74—573 |

S. CLEMENT SWISHER, Primary Examiner